(12) United States Patent
Harvey et al.

(10) Patent No.: US 11,490,537 B2
(45) Date of Patent: Nov. 1, 2022

(54) DISTRIBUTED BUILDING AUTOMATION CONTROLLERS

(71) Applicant: PassiveLogic, Inc., Salt Lake City, UT (US)

(72) Inventors: Troy Aaron Harvey, Brighton, UT (US); Jeremy David Fillingim, Salt Lake City, UT (US)

(73) Assignee: PassiveLogic, Inc., Salt Lake City, UT (US)

( * ) Notice: Subject to any disclaimer, the term of this patent is extended or adjusted under 35 U.S.C. 154(b) by 8 days.

(21) Appl. No.: 17/135,212

(22) Filed: Dec. 28, 2020

(65) Prior Publication Data

US 2022/0066402 A1    Mar. 3, 2022

Related U.S. Application Data

(60) Provisional application No. 63/070,460, filed on Aug. 26, 2020.

(51) Int. Cl.
*H05K 7/14* (2006.01)
*G06F 8/51* (2018.01)
(Continued)

(52) U.S. Cl.
CPC ............ *H05K 7/1465* (2013.01); *F24F 11/32* (2018.01); *F24F 11/49* (2018.01); *F24F 11/63* (2018.01);
(Continued)

(58) Field of Classification Search
CPC .................................................. G05B 13/0265
(Continued)

(56) References Cited

U.S. PATENT DOCUMENTS

| 4,353,653 A | 10/1982 | Zimmerman |
| 5,208,765 A | 5/1993 | Turnbull |

(Continued)

FOREIGN PATENT DOCUMENTS

| CN | 103926912 B | 5/2014 |
| CN | 103926912 A | 7/2014 |

(Continued)

OTHER PUBLICATIONS

Gungor, Vehbi C., and Gerhard P. Hancke. "Industrial wireless sensor networks: Challenges, design principles, and technical approaches." IEEE Transactions on industrial electronics 56.10 (2009): pp. 4258-4265. (Year: 2009).*

(Continued)

*Primary Examiner* — Satish Rampuria

(57) ABSTRACT

Controllers that control a building's state functions can be controlled by a master controller that the controllers choose themselves. The master controller communicates with the controllers and sensors to determine when a building state should change. When the building state should change, the master controller or another controller determines the device or devices that need to modify state values of the building, and send messages to the devices so that they can change building state. If the master controller has a fault, the working controllers can choose another master controller. When a sensor indicates that a building state needs to be changed the master controller determines which device should change state, then tells the controller that is attached to the device.

20 Claims, 8 Drawing Sheets

(51) Int. Cl.

| | | |
|---|---|---|
| *G06F 3/041* | (2006.01) | |
| *G05B 19/048* | (2006.01) | |
| *H04M 3/30* | (2006.01) | |
| *G05B 15/02* | (2006.01) | |
| *G06F 3/04847* | (2022.01) | |
| *G06F 3/147* | (2006.01) | |
| *G05B 23/02* | (2006.01) | |
| *H02J 3/00* | (2006.01) | |
| *F24F 11/63* | (2018.01) | |
| *H04W 4/80* | (2018.01) | |
| *G06F 30/13* | (2020.01) | |
| *G06F 30/12* | (2020.01) | |
| *G06F 3/0482* | (2013.01) | |
| *H04L 67/125* | (2022.01) | |
| *G06F 30/18* | (2020.01) | |
| *G06F 8/41* | (2018.01) | |
| *G06F 8/53* | (2018.01) | |
| *G06F 8/74* | (2018.01) | |
| *F24F 11/32* | (2018.01) | |
| *F24F 11/88* | (2018.01) | |
| *F24F 11/49* | (2018.01) | |
| *G05B 13/02* | (2006.01) | |
| *H04L 67/12* | (2022.01) | |
| *G06F 1/3209* | (2019.01) | |
| *G06F 1/3246* | (2019.01) | |
| *G06F 9/4401* | (2018.01) | |
| *H04W 84/00* | (2009.01) | |
| *G06Q 30/02* | (2012.01) | |
| *H04B 3/46* | (2015.01) | |
| *H04L 43/50* | (2022.01) | |
| *H04L 67/75* | (2022.01) | |
| *G01R 31/55* | (2020.01) | |
| *G06F 30/392* | (2020.01) | |
| *G06F 113/04* | (2020.01) | |
| *G06F 115/12* | (2020.01) | |
| *G06F 111/04* | (2020.01) | |
| *G06F 111/16* | (2020.01) | |
| *G06F 113/16* | (2020.01) | |

(52) U.S. Cl.
CPC ............ *F24F 11/88* (2018.01); *G01R 31/55* (2020.01); *G05B 13/0265* (2013.01); *G05B 15/02* (2013.01); *G05B 19/048* (2013.01); *G05B 23/0216* (2013.01); *G05B 23/0264* (2013.01); *G05B 23/0272* (2013.01); *G06F 1/3209* (2013.01); *G06F 1/3246* (2013.01); *G06F 3/0482* (2013.01); *G06F 3/04186* (2019.05); *G06F 3/04847* (2013.01); *G06F 3/147* (2013.01); *G06F 8/436* (2013.01); *G06F 8/51* (2013.01); *G06F 8/53* (2013.01); *G06F 8/74* (2013.01); *G06F 9/4418* (2013.01); *G06F 30/12* (2020.01); *G06F 30/13* (2020.01); *G06F 30/18* (2020.01); *G06Q 30/0283* (2013.01); *H02J 3/00* (2013.01); *H04B 3/46* (2013.01); *H04L 43/50* (2013.01); *H04L 67/12* (2013.01); *H04L 67/125* (2013.01); *H04L 67/75* (2022.05); *H04M 3/305* (2013.01); *H04W 4/80* (2018.02); *H04W 84/00* (2013.01); *H05K 7/1468* (2013.01); *H05K 7/1477* (2013.01); *H05K 7/1481* (2013.01); *G06F 30/392* (2020.01); *G06F 2111/04* (2020.01); *G06F 2111/16* (2020.01); *G06F 2113/04* (2020.01); *G06F 2113/16* (2020.01); *G06F 2115/12* (2020.01); *H02J 2310/12* (2020.01)

(58) Field of Classification Search
USPC .................................................. 700/275–294
See application file for complete search history.

(56) References Cited

U.S. PATENT DOCUMENTS

| | | | |
|---|---|---|---|
| 5,530,643 | A | 6/1996 | Hodorowski |
| 6,275,962 | B1 | 8/2001 | Fuller et al. |
| 6,301,341 | B1 | 10/2001 | Gizara et al. |
| 6,437,692 | B1 * | 8/2002 | Petite .................. G08B 25/009 |
| | | | 702/56 |
| 6,606,731 | B1 | 8/2003 | Baum et al. |
| 6,645,066 | B2 | 11/2003 | Gutta et al. |
| 6,813,777 | B1 | 11/2004 | Weinberger et al. |
| 6,891,838 | B1 * | 5/2005 | Petite .................. H04L 12/2836 |
| | | | 340/870.02 |
| 7,102,502 | B2 * | 9/2006 | Autret ..................... H04L 63/08 |
| | | | 340/3.52 |
| 7,578,135 | B2 | 8/2009 | Mattheis |
| 7,587,250 | B2 | 9/2009 | Coogan et al. |
| 7,729,882 | B2 | 6/2010 | Seem |
| 7,734,572 | B2 | 6/2010 | Wiemeyer et al. |
| 7,835,431 | B2 | 11/2010 | Belge |
| 7,917,232 | B2 | 3/2011 | McCoy et al. |
| 8,024,054 | B2 | 9/2011 | Mairs et al. |
| 8,099,178 | B2 | 1/2012 | Mairs et al. |
| 8,503,943 | B2 | 8/2013 | Spanhake |
| 8,643,476 | B2 | 2/2014 | Pinn et al. |
| 8,749,959 | B2 | 6/2014 | Riley et al. |
| 8,782,619 | B2 | 7/2014 | Wu et al. |
| 8,925,358 | B2 | 1/2015 | Kasper |
| 9,441,847 | B2 | 9/2016 | Grohman |
| 9,521,724 | B1 | 12/2016 | Berry et al. |
| 9,544,209 | B2 | 1/2017 | Gielarowski et al. |
| 9,602,301 | B2 | 3/2017 | Averitt |
| 9,664,400 | B2 | 5/2017 | Wroblewski et al. |
| 9,678,494 | B2 | 6/2017 | Hyde et al. |
| 9,740,385 | B2 | 8/2017 | Fadell et al. |
| 9,791,872 | B2 | 10/2017 | Wang et al. |
| 9,857,238 | B2 | 1/2018 | Malhotra et al. |
| 9,860,961 | B2 | 1/2018 | Chemel et al. |
| 9,952,573 | B2 | 4/2018 | Sloo et al. |
| 10,094,586 | B2 | 10/2018 | Pavlovski et al. |
| 10,223,721 | B1 | 3/2019 | Bhatia |
| 10,334,758 | B1 | 6/2019 | Ramirez et al. |
| 10,512,143 | B1 | 12/2019 | Ikehara et al. |
| 10,528,016 | B2 | 1/2020 | Noboa |
| 10,557,889 | B2 | 2/2020 | Montoya et al. |
| 10,558,183 | B2 | 2/2020 | Piaskowski et al. |
| 10,627,124 | B2 | 4/2020 | Walser et al. |
| 10,640,211 | B2 | 5/2020 | Whitten et al. |
| 10,672,293 | B2 | 6/2020 | Labutov et al. |
| 10,892,946 | B2 | 1/2021 | Costa et al. |
| 10,900,489 | B2 | 1/2021 | Rendusara et al. |
| 10,942,871 | B2 | 3/2021 | Cawse et al. |
| 10,943,444 | B2 | 3/2021 | Boyd et al. |
| 10,966,068 | B2 | 3/2021 | Tramiel et al. |
| 10,966,342 | B2 * | 3/2021 | Lairsey ................. G06T 19/006 |
| 10,969,133 | B2 | 4/2021 | Harvey |
| 11,088,989 | B2 | 8/2021 | Gao et al. |
| 11,294,254 | B2 | 4/2022 | Patterson et al. |
| 2004/0236547 | A1 | 11/2004 | Rappaport et al. |
| 2005/0040247 | A1 | 2/2005 | Pouchak |
| 2007/0096902 | A1 | 5/2007 | Seeley et al. |
| 2007/0162288 | A1 | 7/2007 | Springhart et al. |
| 2008/0222584 | A1 | 9/2008 | Habib et al. |
| 2008/0270951 | A1 | 10/2008 | Anand et al. |
| 2008/0277486 | A1 | 11/2008 | Seem et al. |
| 2009/0189764 | A1 | 7/2009 | Keller et al. |
| 2010/0005218 | A1 | 1/2010 | Gower et al. |
| 2010/0025483 | A1 | 2/2010 | Hoeynck et al. |
| 2010/0131933 | A1 | 5/2010 | Kim et al. |
| 2010/0162037 | A1 | 6/2010 | Maule et al. |
| 2010/0237891 | A1 | 9/2010 | Lin et al. |
| 2011/0087988 | A1 | 4/2011 | Ray et al. |
| 2011/0125930 | A1 | 5/2011 | Tantos et al. |

(56) References Cited

U.S. PATENT DOCUMENTS

| | | |
|---|---|---|
| 2012/0102472 A1 | 4/2012 | Wu et al. |
| 2012/0221986 A1 | 8/2012 | Whitford et al. |
| 2013/0343207 A1 | 12/2013 | Cook et al. |
| 2013/0343388 A1 | 12/2013 | Stroud et al. |
| 2013/0343389 A1 | 12/2013 | Stroud et al. |
| 2013/0343390 A1 | 12/2013 | Moriarty et al. |
| 2013/0346987 A1 | 12/2013 | Raney et al. |
| 2014/0088772 A1 | 3/2014 | Lelkens |
| 2014/0101082 A1 | 4/2014 | Matsuoka et al. |
| 2014/0215446 A1 | 7/2014 | Araya et al. |
| 2014/0277757 A1 | 9/2014 | Wang et al. |
| 2014/0358291 A1 | 12/2014 | Wells |
| 2014/0364985 A1 | 12/2014 | Tiwari et al. |
| 2015/0081928 A1 | 3/2015 | Wintzell et al. |
| 2015/0198938 A1 | 7/2015 | Steele et al. |
| 2015/0234381 A1 | 8/2015 | Ratilla et al. |
| 2016/0016454 A1 | 1/2016 | Yang et al. |
| 2016/0062753 A1 | 3/2016 | Champagne |
| 2016/0086242 A1 | 3/2016 | Schafer et al. |
| 2016/0088438 A1 | 3/2016 | O'Keeffe |
| 2016/0092427 A1 | 3/2016 | Bittmann |
| 2016/0132308 A1 | 5/2016 | Muldoon |
| 2016/0195856 A1* | 7/2016 | Spero .............. H05B 47/155 700/90 |
| 2016/0285715 A1 | 9/2016 | Gielarowski et al. |
| 2016/0295663 A1 | 10/2016 | Hyde et al. |
| 2017/0075323 A1 | 3/2017 | Shrivastava et al. |
| 2017/0097259 A1 | 4/2017 | Brown et al. |
| 2017/0131611 A1 | 5/2017 | Brown et al. |
| 2017/0149638 A1 | 5/2017 | Gielarowski et al. |
| 2017/0159962 A1* | 6/2017 | Walser .................. G05B 15/02 |
| 2017/0169075 A1 | 6/2017 | Jiang et al. |
| 2017/0176034 A1 | 6/2017 | Hussain et al. |
| 2017/0322579 A1 | 11/2017 | Goparaju et al. |
| 2017/0365908 A1 | 12/2017 | Hughes et al. |
| 2018/0005195 A1 | 1/2018 | Jacobson |
| 2018/0075168 A1 | 3/2018 | Tiwari et al. |
| 2018/0089172 A1 | 3/2018 | Needham |
| 2018/0202678 A1 | 7/2018 | Ahuja et al. |
| 2018/0224819 A1* | 8/2018 | Noboa ................... F24F 11/32 |
| 2018/0266716 A1 | 9/2018 | Bender et al. |
| 2018/0307781 A1 | 10/2018 | Byers et al. |
| 2019/0087076 A1 | 3/2019 | Dey et al. |
| 2019/0138704 A1 | 5/2019 | Shrivastava et al. |
| 2019/0156443 A1 | 5/2019 | Hall |
| 2019/0173109 A1 | 6/2019 | Wang |
| 2019/0294018 A1 | 9/2019 | Shrivastava et al. |
| 2020/0003444 A1 | 1/2020 | Yuan et al. |
| 2020/0018506 A1 | 1/2020 | Ruiz et al. |
| 2020/0050161 A1 | 2/2020 | Noboa |
| 2020/0133257 A1 | 4/2020 | Cella et al. |
| 2020/0150508 A1 | 5/2020 | Patterson et al. |
| 2020/0167442 A1 | 5/2020 | Roecker et al. |
| 2020/0187147 A1 | 6/2020 | Meerbeek et al. |
| 2020/0221269 A1* | 7/2020 | Tramiel .............. H04W 80/045 |
| 2020/0226223 A1 | 7/2020 | Reichl |
| 2020/0228759 A1 | 7/2020 | Ryan et al. |
| 2020/0255142 A1 | 8/2020 | Whitten et al. |
| 2020/0279482 A1 | 9/2020 | Berry et al. |
| 2020/0287786 A1 | 9/2020 | Anderson et al. |
| 2020/0288558 A1 | 9/2020 | Anderson et al. |
| 2020/0342526 A1 | 10/2020 | Ablanczy |
| 2020/0379730 A1 | 12/2020 | Graham et al. |
| 2020/0387041 A1 | 12/2020 | Shrivastava et al. |
| 2020/0387129 A1 | 12/2020 | Chandaria |
| 2021/0073441 A1* | 3/2021 | Austern ................. G06F 30/13 |
| 2021/0081504 A1 | 3/2021 | Mccormick et al. |
| 2021/0081880 A1 | 3/2021 | Bivins et al. |
| 2021/0157312 A1 | 5/2021 | Cella et al. |
| 2021/0182660 A1 | 6/2021 | Amirguliyev et al. |
| 2021/0366793 A1 | 11/2021 | Hung et al. |
| 2021/0383041 A1 | 12/2021 | Harvey et al. |
| 2021/0400787 A1 | 12/2021 | Abbo et al. |
| 2022/0070293 A1 | 3/2022 | Harvey et al. |

FOREIGN PATENT DOCUMENTS

| | | |
|---|---|---|
| CN | 206002869 U | 8/2016 |
| CN | 206002869 U | 3/2017 |
| CN | 206489622 U | 9/2017 |
| CN | 206489622 U | 9/2017 |
| JP | 6301341 B2 | 3/2018 |
| WO | 2008016500 A3 | 3/2008 |
| WO | 2012019328 A1 | 2/2012 |

OTHER PUBLICATIONS

Amin, Massoud. "Toward self-healing energy infrastructure systems." IEEE Computer Applications in Power 14.1 (2001): pp. 20-28. (Year: 2001).*

Guo, Wenqi, and Mengchu Zhou. "An emerging technology for improved building automation control." 2009 IEEE International Conference on Systems, Man and Cybernetics. IEEE, 2009.pp.337-342 (Year: 2009).*

Wenqi Wendy, G. U. O., Willam M. Healy, and Z. H. O. U. Mengchu. "Wireless mesh networks in intelligent building automation control: A survey." International Journal of Intelligent Control and Systems 16.1 (2011): pp. 28-36. (Year: 2011).*

Shailendra, Eshan, and Praneet Kaur Bhatia. "Analyzing home automation and networking technologies." IEEE Potentials 37.1 (2018): pp. 27-33. (Year: 2018).*

Kastner, Wolfgang, et al. "Building Automation Systems Integration into the Internet of Things The IoT6 approach, its realization and validation." Proceedings of the 2014 IEEE Emerging Technology and Factory Automation (ETFA). IEEE, 2014.pp. 1-9 (Year: 2014).*

Wang et al., "A Practical Multi-Sensor Cooling Demand Estimation Approach Based on Visual Indoor and Outdoor Information Sensing," Sensors 2018, 18, 3591; doi:10.3390.

De Meester et al., SERIF:A Semantic ExeRcise Interchange FormatConference: Proceedings of the 1st International Workshop on LINKed EDucation, Oct. 2015.

Kalagnanam et al., "A System For Automated Mapping of Bill-of_ Materials Part Numbers", KDD '04: Proceedings of the tenth ACM SIGKDD international conference on Knowledge discovery and data mining, Aug. 2004, pp. 805-810.

Mouser Electronics News Release, Aug. 16, 2018.

Ouf et al., Effectiveness of using WiFi technologies to detect and predict building occupancy, Sust. Buildi. 2, 7 (2017).

RadioMaze, Inc., "WiFi signals enable motion recognition throughout the entire home," Dec. 4, 2017.

Sensorswarm, 2018.

Serale G., et al., Model Predictive Control (MPC) for Enhancing Building and HVAC System Energy Efficiency: Problem Formulation, Applications and Opportunities, Energies 2018, 11, 631; doi:10. 3390, Mar. 12, 2018.

Siano, P, "Demand response and smart grids—A survey", Renewable and Sustainable Energy Reviews 30 (2014) 461-478.

Yegulap, Serdar, "What is LLVM? The power behind Swift, Rust, Clang, and more," Infoworld, Mar. 11, 2020.

BigLadder Software Full Ref, Occupant Thermal Comfort: Engineering Reference, 2014, The Board of Trustees of the University of Illinois and the Regents of the University of California through the Ernest Orlando Lawrence Berkeley National Laboratory (Year: 2014).

Hagentoft et al. Full Reference, Assessment Method of Numerical Prediction Models for Combined Heat, Air and Moisture Transfer in Building Components: Benchmarks for One-dimensional Cases, Journal of Thermal Env. & Bldg. Sci., vol. 27, No. 4, Apr. 2004.

U.S. Appl. No. 15/995,019 (7340.2.2) Office Action dated Jul. 26, 2019.

U.S. Appl. No. 15/995,019 (7340.2.2) Office Action dated Oct. 8, 2020.

U.S. Appl. No. 15/995,019 (7340.2.2) Office Action dated Apr. 15, 2020.

Assad, et al., Back Propagation Neural Networks (BPNN) and

(56) References Cited

OTHER PUBLICATIONS

Sigmoid Activation Function in Multi-Layer Networks, Academic Journal of Nawroz University 8(4):216, Nov. 2019.

\* cited by examiner

DISTRIBUTED BUILDING AUTOMATION CONTROLLERS

RELATED APPLICATION

The present application hereby incorporates by reference the entirety of, and claims priority to, U.S. Provisional Patent Application Ser. No. 63/070,460 filed 26 Aug. 2020.

FIELD

The present disclosure relates to controllers automatically controlling devices. More specifically, to controllers using a self-healing controller network to control devices.

BACKGROUND

Controlling buildings is a huge problem because the amount of computing power required to determine the best device usage is so large. In the past, buildings react to actions that have already happened—for example, a thermometer drops to a low level, which turns on a furnace. To optimize a building, one must look into the future, not just react to the past. However, buildings are complex systems with hundreds of sensors, and hundreds of devices that can be controlled, which leads to billions or even trillions of possible states that must be accounted for. Trying to run such complex programs in a cloud computing environment, even if it can be done, leads to serious bandwidth and latency issues.

SUMMARY

This summary is provided to introduce a selection of concepts in a simplified form that are further described below in the Detailed Description section. This summary does not identify required or essential features of the claimed subject matter.

In general, one innovative embodiment comprises using distributed building automation controllers to compute building operating behavior within a defined space. The defined space has a device, a sensor, and an operating characteristic. The operating characteristic may a single state, such as temperature, or may be a combination of states, such as what temperature a human would perceive—a comfort state. The device has a device characteristic, which is the state its is in (on/off/intermediate), a state that it can be in, etc. The sensor has data associated with it. The defined space has at least two controllers in it, one of which can control the device and accept data from the sensor. The first controller and the second controller are operationally able to run the computer program. The computer program can determine desired device behavior based on the desired defined space operating characteristic, the sensor data, and the device characteristic.

In an innovative embodiment, distributed defined space controllers compute defined space operating behavior. The distributed defined space controllers each have at least one processor coupled with memory-stored instructions, one of the distributed defined space controllers is designated as a master controller. The defined space also has a sensor and a device, the device coupled to one of the controllers. The sensor senses a sensor state value then passes that value to the master controller. The master controller determines which device in the defined space will modify the state of defined space to meet a desired state in the defined space. To do so, the master controller determines which device must be modified to modify the state. It then determines which controller directly controls the device, and passes the information on to the controller. The controller can then send instructions to the device so that it modifies state of the defined space.

The foregoing and other embodiments can each optionally include one or more of the following features, alone or in combination. Additional features and advantages will become apparent from the following detailed description of illustrated embodiments, which proceeds with reference to accompanying drawings.

BRIEF DESCRIPTION OF THE FIGURES

Non-limiting and non-exhaustive embodiments of the present embodiments are described with reference to the following FIGURES, wherein like reference numerals refer to like parts throughout the various views unless otherwise specified.

Figure 1:
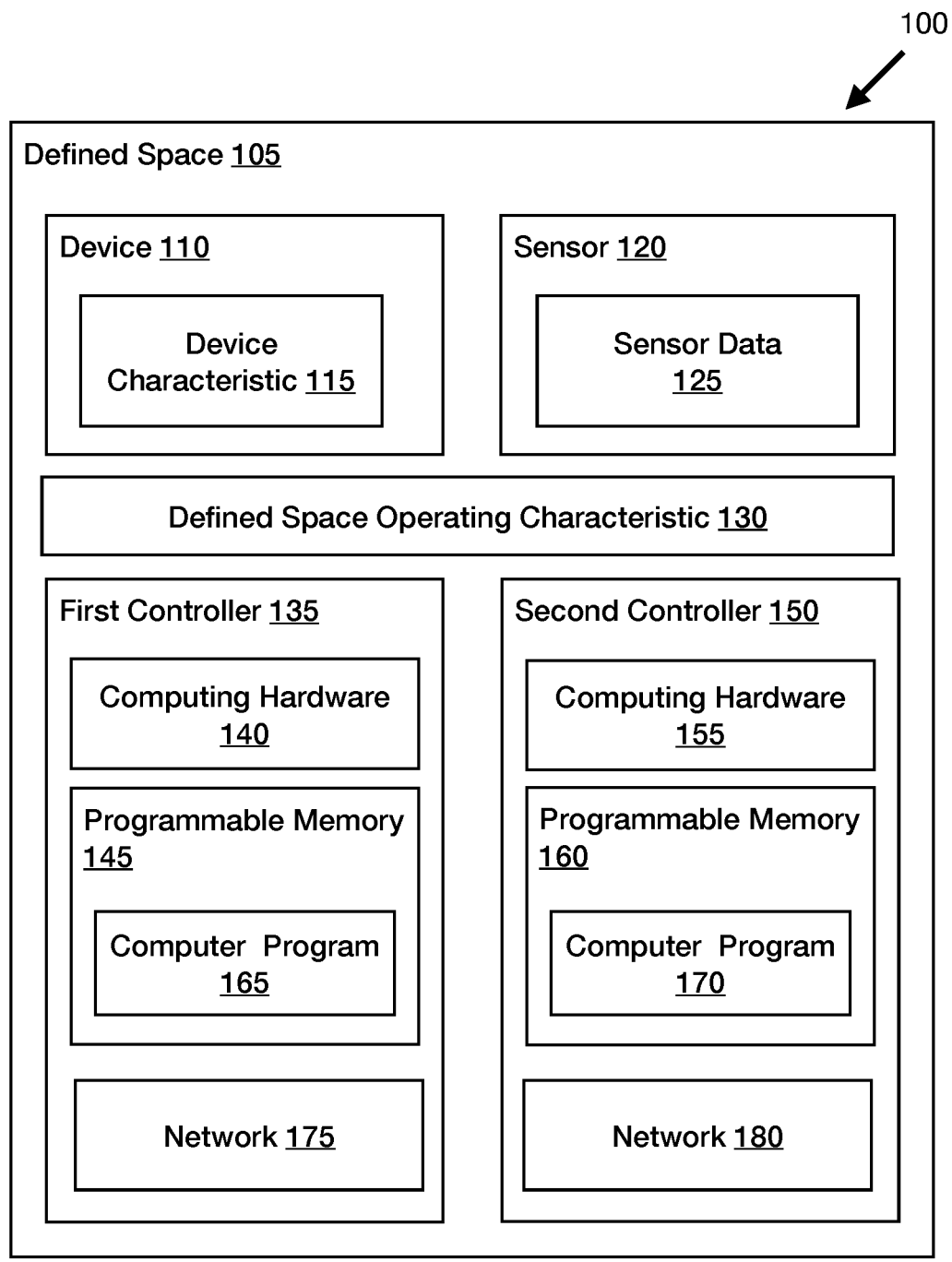
FIG. 1 is a functional block diagram showing an exemplary embodiment of a distributed controller system in conjunction which described embodiments can be implemented.

Corresponding reference characters indicate corresponding components throughout the several views of the drawings. Skilled artisans will appreciate that elements in the FIGURES are illustrated for simplicity and clarity and have not necessarily been drawn to scale. For example, the dimensions of some of the elements in the figures may be exaggerated relative to other elements to help to improve understanding of various embodiments. Also, common but well-understood elements that are useful or necessary in a commercially feasible embodiment are often not depicted in order to facilitate a less obstructed view of these various embodiments.

DETAILED DESCRIPTION

Disclosed below are representative embodiments of methods, computer-readable media, and systems having particular applicability to controllers using a self-chosen master controller and other controllers. Described embodiments implement one or more of the described technologies. In the following description, numerous specific details are set forth in order to provide a thorough understanding of the present embodiments. It will be apparent, however, to one having ordinary skill in the art that the specific detail need not be employed to practice the present embodiments. In other instances, well-known materials or methods have not been described in detail in order to avoid obscuring the present embodiments. "one embodiment", "an embodiment", "one example" or "an example" means that a particular feature, structure or characteristic described in connection with the embodiment or example is included in at least one embodiment of the present embodiments. Thus, appearances of the phrases "in one embodiment", "in an embodiment", "one example" or "an example" in various places throughout this specification are not necessarily all referring to the same embodiment or example. Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order.

In addition, it is appreciated that the figures provided herewith are for explanation purposes to persons ordinarily skilled in the art and that the drawings are not necessarily drawn to scale. To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

Embodiments in accordance with the present embodiments may be implemented as an apparatus, method, or computer program product. Accordingly, the present embodiments may take the form of an entirely hardware embodiment, an entirely software embodiment (including firmware, resident software, micro-code, etc.), or an embodiment combining software and hardware aspects that may all generally be referred to herein as a "module" or "system." Furthermore, the present embodiments may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present embodiments may be written in any combination of one or more programming languages.

The flowchart and block diagrams in the flow diagrams illustrate the architecture, functionality, and operation of possible implementations of systems, methods, and computer program products according to various embodiments of the present embodiments. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

As used herein, the terms "comprises," "comprising," "includes," "including," "has," "having," or any other variation thereof, are intended to cover a non-exclusive inclusion. For example, a process, article, or apparatus that comprises a list of elements is not necessarily limited to only those elements but may include other elements not expressly listed or inherent to such process, article, or apparatus.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present). "Program" is used broadly herein, to include applications, kernels, drivers, interrupt handlers, firmware, state machines, libraries, and other code written by programmers (who are also referred to as developers) and/or automatically generated. "Optimize" means to improve, not necessarily to perfect. For example, it may be possible to make further improvements in a program or an algorithm which has been optimized.

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided.

Additionally, any examples or illustrations given herein are not to be regarded in any way as restrictions on, limits to, or express definitions of any term or terms with which they are utilized. Instead, these examples or illustrations are to be regarded as being described with respect to one particular embodiment and as being illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," and "in one embodiment."

Various alternatives to the implementations described herein are possible. For example, embodiments described with reference to flowchart diagrams can be altered, such as, for example, by changing the ordering of stages shown in the flowcharts, or by repeating or omitting certain stages.

I. Overview

In some implementations, a building's devices are run by a series of connected computers which are also controllers. The connected computers are controllers because some of the controllers have devices used to modify state of the building wired to them. For example, a controller may have furnaces, air conditioners, and other HVAC equipment attached to it that it controls. A controller may have security equipment, entertainment equipment, irrigation equipment, etc., which it controls by sending messages to the equipment through a hard-wired connection or a wireless connection, or both. The computer/controllers can be thought of as a compute swarm of control nodes because they behave as a distributed system to run the programs necessary to determine how to better run the devices. The computer/controllers may run programs as a distributed system that optimizes the devices for energy savings, equipment wear, rapid modification of building state, or some other optimization factor. The controllers have mechanisms of locating one another, as they are connected through a network.

In some embodiments, a sensor provides input data, that will trigger an action by a device. For example, the temperature may rise in a building zone, so an air conditioner should be turned on. In some embodiments, the temperature sensor tells a controller that the temperature at a specific zone is X. The controller can then pass this information on to a master controller which determines that a temperature of X requires device Y to be turned on. The master controller then sends a signal to the controller that is connected to device Y. The controller then turns on device Y. A given problem may only need a subset of the connected computer/controllers. Specifically, in some embodiments, the sensor and the device will be connected to the same controller, so that the controller can bypass the master controller to turn on device Y. In such a system the master computer find the triplet that is required—the sensor, the device that is to be controlled, and the controller that the device is connected to. This might entail a mechanism of self-federating around three pieces of equipment: sensor; device to be controlled, and the controller that can control the device.

The intelligence in the system is diffuse, such that there are multiple controllers that can be the master controller. The controllers can select their own master controller. If a master controller has problems (such as network problems), the remaining controllers can choose a new master controller.

II. Exemplary System to Manage Building Operating Behavior

With reference to FIG. 1, a system is shown that may be used, in whole, or in part, in any of the embodiments disclosed herein. FIG. 1 describes an exemplary system 100 to use distributed building automation controllers and sensors to compute building operating behavior within the building is described. This system may be used with any of the embodiments described herein. In the system 100, a defined space 105 is disclosed. This defined space can be a room, a portion of a room, a floor of a building, an entire building, a defined outside space, such as a garden or a field, and so on. A device 110 with a device characteristic 115 is in the defined space. The device can be a controllable piece of equipment such as a fan, a furnace, a boiler, an air conditioner, a solar panel, and so on. A device may also be a piece of equipment that is not controlled, such as a vent. The device characteristic 115 may be any characteristic of the device, such as its current operating characteristic (such as on or off), its state-change capability (e.g., how quickly it can change state such as temperature when on), etc.

A sensor 120 with sensor data 125 is also in the defined space. The sensor 120 may be any type of sensor, such as a thermostat, a humidity sensor, a VOC sensor, a noise sensor, an occupancy sensor, or a sensor that has more than one function, such as a combined thermostat and humidity sensor. The sensor data 125 may be the current sensor value, may be a historical set of values, or may be a different sort of data, or timing of data that the sensor keeps.

The defined space 105 also has a defined space operating characteristic 130. This is a characteristic that the defined space is expected to have. For example, if the characteristic is a temperature characteristic, the characteristic may be a temperature that the defined space is expected to be at. If the temperature characteristic is 70 degrees, then the defined space operating characteristic is "keep the building at 70 degrees." In some embodiments, this characteristic may be a time curve of the characteristic. For example, the building may be expected to be at 60 degrees between the hours of 6 pm and 7 am, and at 70 degrees between 7 am and 6 pm, in which case the defined space operating characteristic is a 24 hour time curve with the temperature 70 degrees between 7 am and 6 pm, and the temperature 60 degrees between the hours 6 pm and 7 am.

In some embodiments, this characteristic may be a humidity characteristic, a radiant heat characteristic, desired entertainment, a sound characteristic (how loud the sound is, what type of sound is being transmitted, etc., grounds feature characteristic (whether or not sprinklers are on, etc), or security characteristic (which parts of the building are locked, which parts should not register having any occupants, etc.). Some of these characteristics may require modifying more than one state, such as temperature and humidity; some of these characteristics may require knowledge of more than one state to determine what state should be modified most efficiently. For instance, heat is perceived by humans as a complex interaction between radiant heat, temperature, humidity and breeze, at least. All of these may be taken into account to determine an operating space characteristic.

In some cases, the defined space operating characteristic may be a comfort characteristic that is a combination of multiple characteristics, which estimates individual occupant comfort based on, e.g., physics principles; and/or may be a characteristic that manages comfort for a group of occupants for the best group satisfaction. In some embodiments, this comprises a human comfort model represented by a mathematical equation based on environmental variables, occupant characteristics and/or occupant preferences. In some embodiments, one or more occupant profiles may be used to calculate the comfort characteristic. The occupant profile comprises information specific to the occupant, such as body weight, gender, age, clothing insulation value, metabolic rate, body mass-index, schedule, preferred temperature, etc. Current environment variables, such as, e.g., temperature, humidity, etc., may also be included. A mathematical equation of human comfort may be used to determine the comfort characteristic. Any human comfort model as known by those of skill in the art may be used to determine the comfort characteristic, such as the Adaptive Comfort Model, Standard Effective Temperature Model, etc. An occupant comfort mean function may be used to calculate the comfort characteristic based on current occupants in the defined space. A combination of any of theses discussed methods may be used to determine the comfort characteristic.

The system further comprises a first controller 135 with computing hardware 140 and programmable memory 145; and a second controller 150 with computing hardware 155 and programmable memory 160. The memory 145, 160 can be any appropriate volatile or non-volatile storage subsystem. For example, the external memory can be volatile memory, e.g., static memory cells, as in FPGAs and some CPLDs; or non-volatile memory, e.g., FLASH memory, as in some CPLDs, or in any other appropriate type of memory cell.

The programmable memory 145, 160 may comprise a computer program 165, 170, with which calculations, such as the defined space operating characteristic 130 may be calculated. The first controller and the second controller are operationally able to run the computer program, either separately, or by the computer program being distributed between the first controller and the second controller. The computer program itself is operationally able to use thermodynamic characteristics of the defined space to determine desired device behavior based on the desired defined space operating characteristic, the sensor data, and the device characteristic.

The controllers 135, 150 also have networks 175, 180 that allow them to communicate with each other and with devices 110 and sensors 120. This network may be a hardwired network, e.g., ethernet, a wireless network, or a combination of both. Many devices may be hardwired to the controller, and communicate with the controller through their hard-wired connection.

Figure 5:
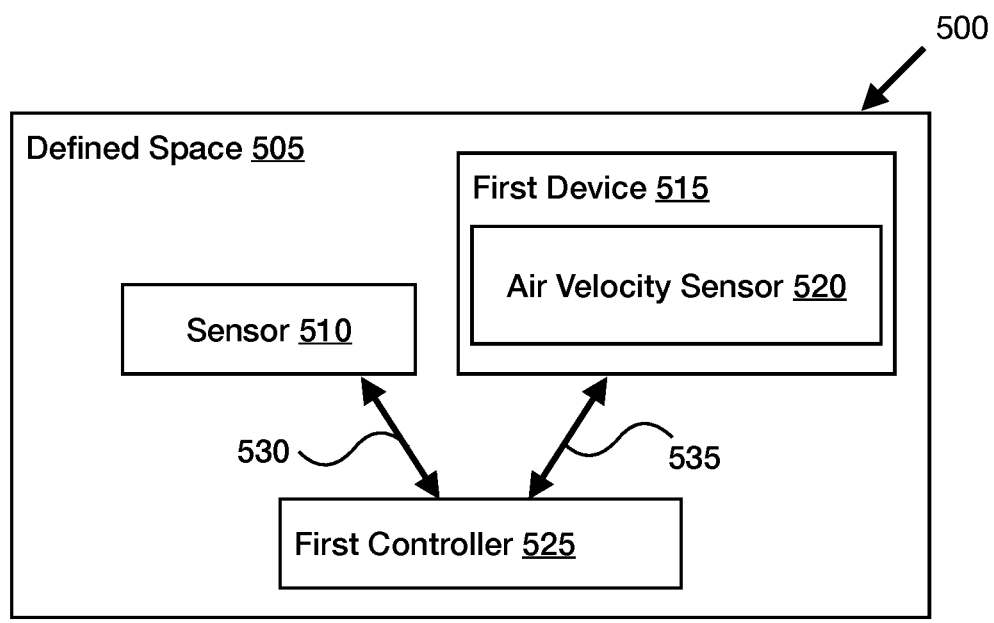
FIG. 5 is a diagram illustrating an embodiment of example relationships between a device, a sensor, and a controller in conjunction with which described embodiments can be implemented.
Figure 6:
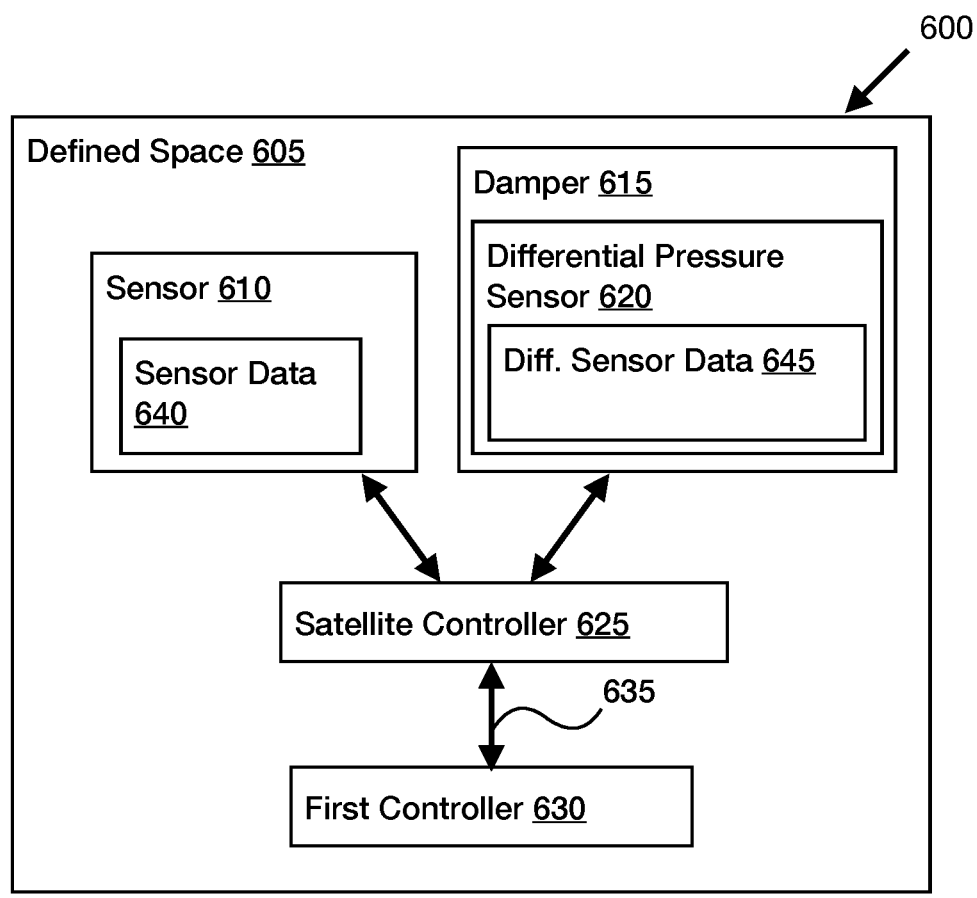
FIG. 6 is a diagram illustrating an embodiment of example relationships between a device, a sensor, a satellite controller and a controller in conjunction with which described embodiments can be implemented.
Figure 7:
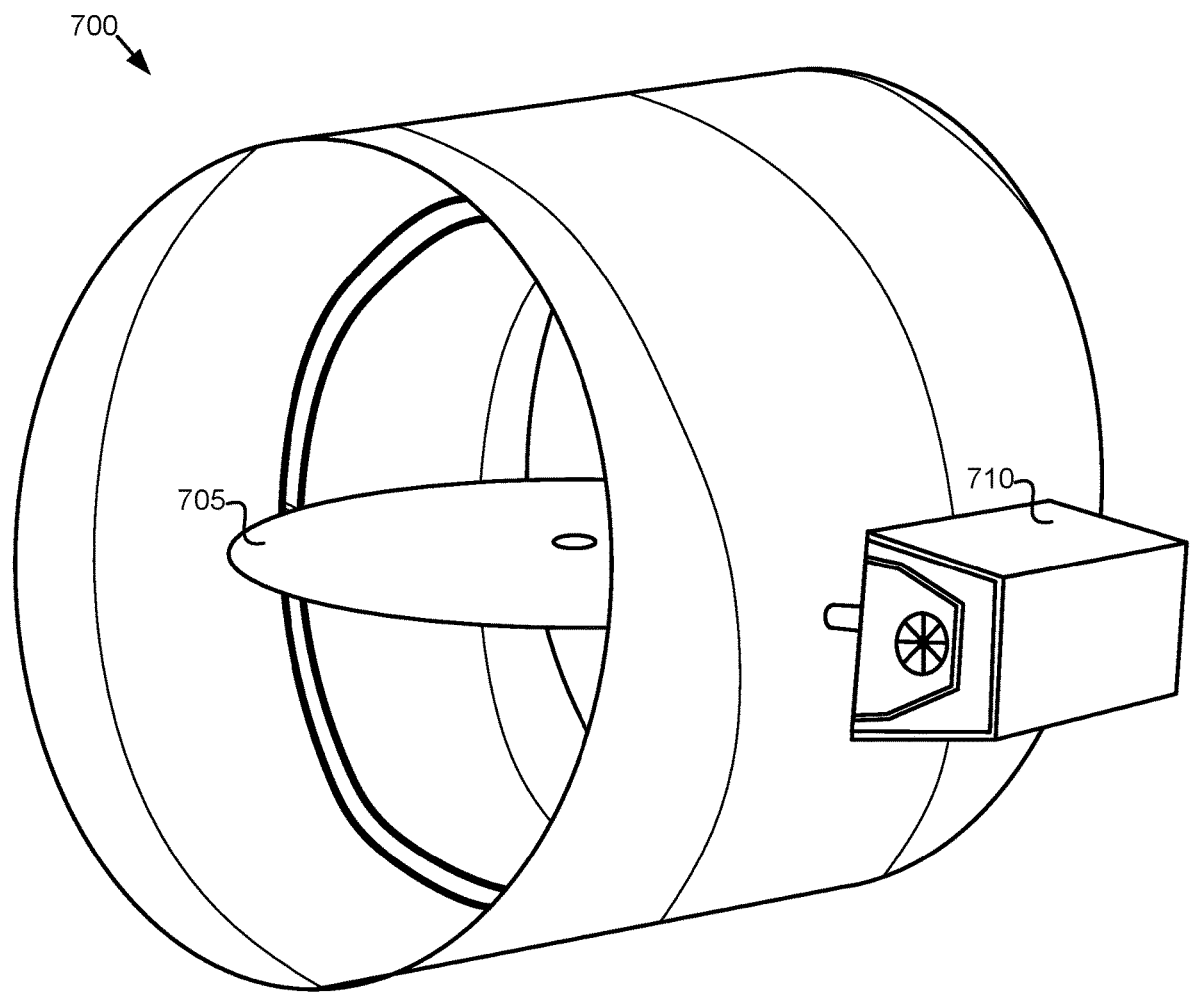
FIG. 7 is a diagram illustrating an exemplary damper in conjunction with which described embodiments can be implemented.
Figure 8:
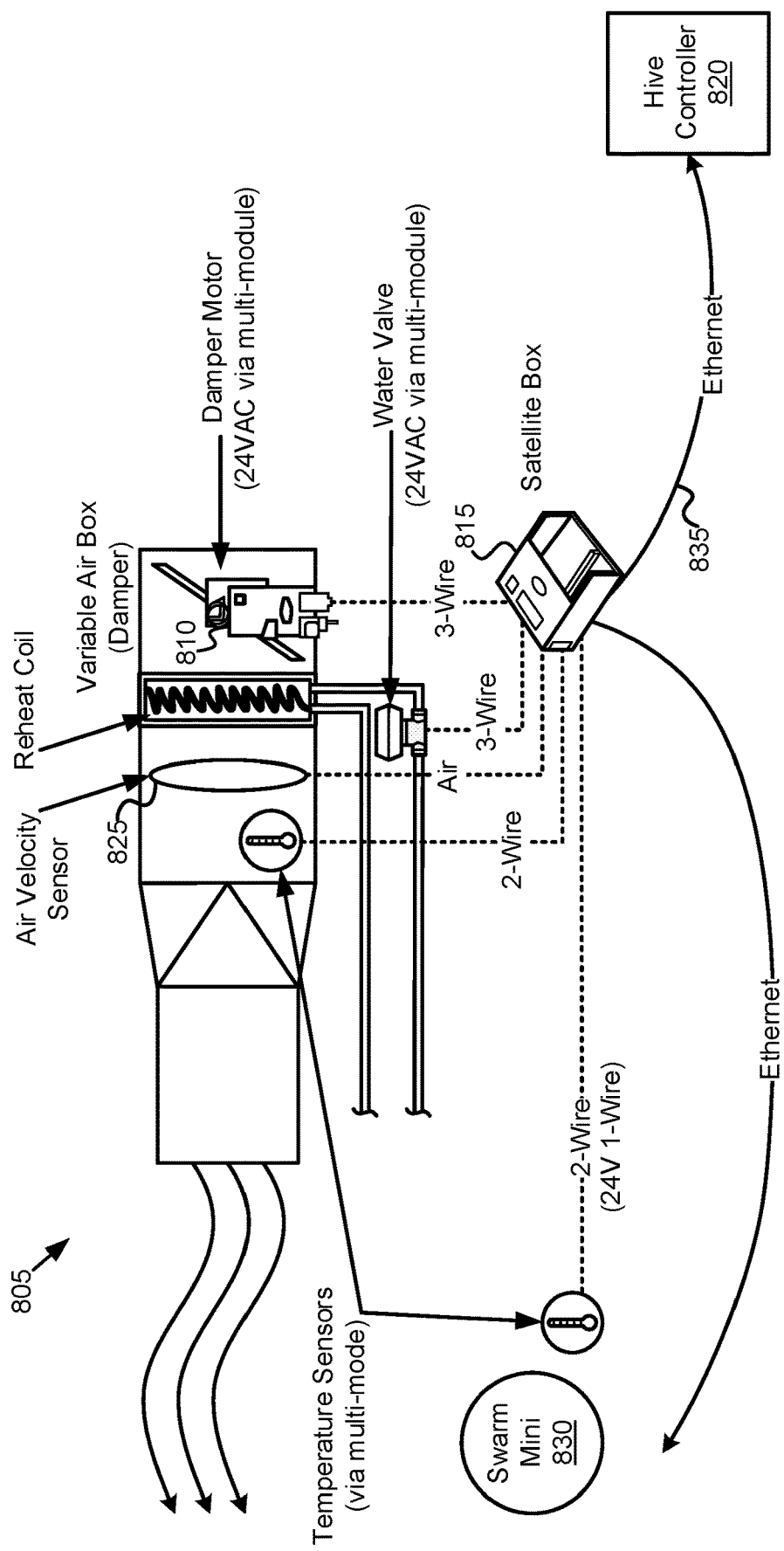
FIG. 8 is a diagram illustrating an exemplary damper control system in conjunction with which described embodiments can be implemented.

As an illustrative example, and with reference to FIGS. 5, 6 and 7, and continuing reference to FIG. 1, dampers 615, 700 are very common in HVAC (Heating, Ventilation and Air Conditioning) systems. When heaters heat air or when coolers cool air, the air itself needs to be distributed throughout the defined space 505 to actually change the temperature of rooms within the building. One common way of controlling the air is by having a damper within air distribution pipes within the various spaces. Opening and closing the damper (e.g., a first device 515) allows control of heated or chilled air into a space, which changes the temperature within the space. An air velocity sensor 520 (which may be a differential pressure sensor 620) is connected 530 to the (first) controller 525 (either by a wired or a wireless connection) which registers the air flow within the damper space 705. The controller 525 receives information 535 from the air velocity sensor 520, and a temperature sensor 510. Using its memory 145 and computing hardware 140, or memory and hardware distributed between multiple controllers, a computer program 165 determines desired device behavior (how far open the damper should be) based on the desired defined space operating characteristic 130 (the temperature the room should be), the sensor data 125 (the current temperature as recorded by the sensor), and the device characteristic 115 (the current state of the damper).

In an embodiment, thermodynamic characteristics of the defined space are used to determine desired device behavior. Such thermodynamic characteristics may comprise a physical equation that uses characteristics of the air in the defined space, such as the resistance and conductivity of the air, thermodynamic characteristics of building material in the defined space, a neural network that defines the defined space using thermodynamic characteristics, etc.

Figure 2:
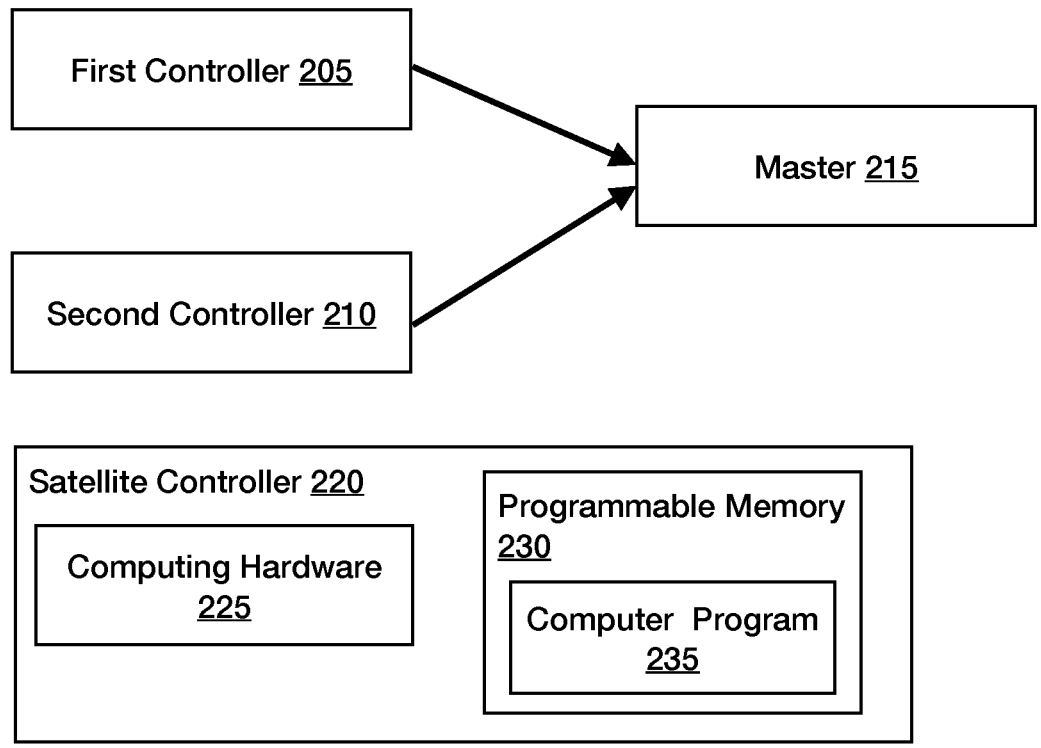
FIG. 2 is a diagram showing an exemplary embodiment of the relationship between controllers, satellite controllers, and a master controller in conjunction which described embodiments can be implemented.

With reference to FIG. 2, the first controller 205 and the second controller 210 are operationally able to choose a master controller 215. They do this by choosing between themselves which controller from among the two will be the master controller. This may be random, may be based on their current memory capability, processing power, communication link strength, some combination of the above, or different characteristics, as known by those of skill in the art. Many more than two computers can be used using the same techniques.

FIG. 2 also discloses a satellite controller 220. A satellite controller 220 may have computing hardware 225, may have programmable memory 230, and may have a computer program in memory 235. A satellite controller also has a way of communicating with the controller(s), either though a wireless connection, or a wired connection, such as ethernet. However, a satellite controller will not be chosen to be a master controller.

Figure 3:
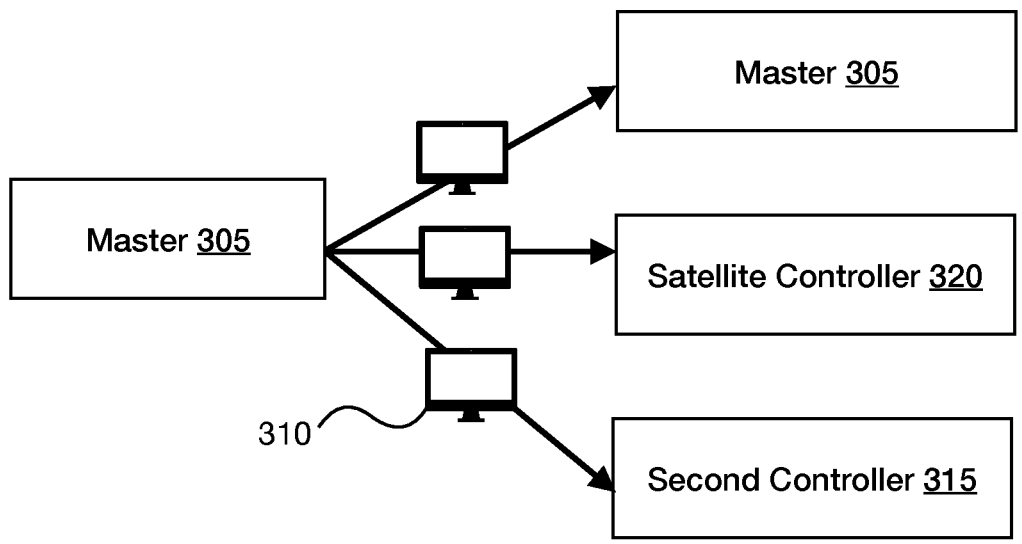
FIG. 3 is a diagram showing an exemplary relationship between controller types in conjunction with which described embodiments can be implemented.

FIG. 3 discloses exemplary relationships between a master controller and other controllers. Once a master controller 305 has been chosen, it is operationally able to divide the computer program into a series of chunks 310, and then distribute the chunks among the available controllers. These chunks need not be the same size. The nature of creating and distributing the chunks should be understood by one of skill in the art.

In some embodiments, when there are three controllers: a master controller 305 (which might be a first controller), a second controller 315, and a satellite controller 320, the master controller can divide the program into three chunks operationally able to determine to run the first chunk 310 on the second controller 315, the second chunk on the satellite controller 320, and a third chunk on itself 305. In some embodiments, the satellite controllers are not used to run programs. In such a case, the master controller will only divide the program into chunks to run on, e.g., the master 305, and the second controller 315. The controllers (e.g., for this example a master controller 305, a second controller 315, and a satellite controller 320) can then assemble into a network using either wired communication (e.g., ethernet), wireless communication, or a combination of the two.

Figure 4:
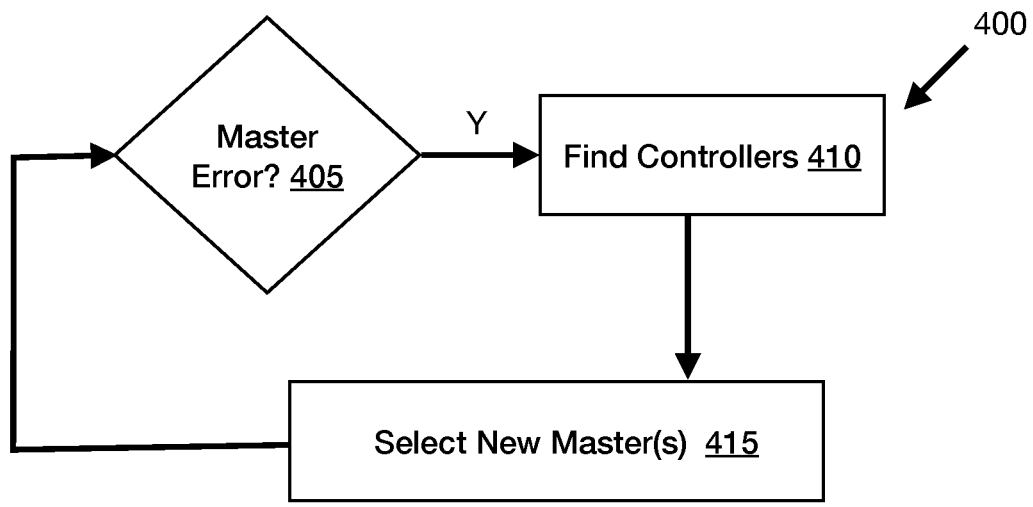
FIG. 4 is a flowchart illustrating an embodiment which selects new controllers with which described embodiments can be implemented.

With reference to FIG. 4, in an embodiment 400 a flow diagram is shown that determines a way that a controller system finds a new master when a master error has been discovered. A controller could have some problem that makes it unusable. This might be an error within the controller itself, may be a connection problem such that the controller cannot talk to other controllers, cannot talk to a portion of the controllers, and so on. When a controller has such a problem, which may be called an error state, the other controllers route around the controller with the error state. When a master controller has an error state 405, e.g., its error state is "on"—for example an error in the controller, or an error in communication between the master and other controllers (such as a cable being cut, a communication line being degraded, a portion of a network going down, etc.), a new master controller needs to be chosen. In some embodiments, the working controllers find each other 410 using some technique known to those of skill in the art. Then, the found controllers choose a new master 415, or choose multiple masters, depending on configurations, and using techniques known through distributed system analysis. In some embodiments, the controllers are self-federating. As such, they may have a federated identity.

Many different situations can trigger an error function; for example, without limitation, a network can become bisected because a network link gets cut, the network becomes inoperable, there is a property of the network that fails independently, such as: the I/O portion of the network fails, even though the other portions appear to be working; for an extended period of time packets are getting dropped; when a master device loses ability to communicate via a network port, etc.

In such an instance, ad-hoc networks may be formed out of the controllers that are currently working. Master or leader elections may happen in these distributed systems, in various embodiments.

These systems may be thought of as self-federating. A federation of distributed components can be moved and changed over a distributed system in a self-organizing manner. In some embodiments, the smallest system that can federate comprises a sensor, a control point (a point on a device that controls the device) and a controller. There are many other levels of components that can federate, such as having each floor of a building self-federating, or some other grouping, which may be physical (all within a certain area), by type (all connected to to a certain device), size (this many devices and sensors per controller) or may be arbitrary.

In an embodiment, the network is self-healing. This means the network can heal around sensors (sensor fusion), and heal around controllers. The network may have redundancy in the sensors. Examining the sensor data around a broken sensor can provide likely data for that sensor. Controllers may also have redundancy so that sensors can find a new controller to talk to and send its sensor data to when the controller they are currently associated with goes down. The new controller will then understand what to do with the sensor data from this specific sensor.

In some instances, there may not be a single master controller; rather, there may be one master and multiple followers. Further the controllers could be organized as multiple masters or completely distributed, with no masters. In which case, there are ad-hoc controls that find one another. Work could thus be organized across an ad-hoc network.

With reference to FIG. 5, at 500 a diagram is shown where a controller uses a sensor to modify a device. An air velocity sensor 520 is attached to a first device 515 in a defined space 505. A first controller 525 is operationally able to to use data from the air velocity sensor 520 and data from the sensor 510 to modify behavior of the first device 515 based on a desired defined space operating characteristic 130. The sensor 510 may be connected 530 to the controller through a wired connection or a wireless connection. The first device may be connected 535 to the controller through a wired connection or a wireless connection.

With reference to FIG. 6, at 600 an embodiment is shown with a satellite controller being used to modify a damper system with a sensor. A defined space 605 comprises a differential pressure sensor 620 attached to a first device (which may be a damper 615) in the defined space 605. A satellite controller 625 is operationally able to send the differential pressure sensor data 645 and the sensor 610 data 640 to the first controller 630. The sensor 610, damper 615, satellite controller 625 and first controller 630 communicate 635 using a wired, wireless or combination wired and wireless system. The first controller 630 is operationally able to to use data 645 from the differential pressure sensor 620 and data 640 from the sensor 610 to determine behavior of the first device necessary to conform to the desired defined space operating characteristic 130. It may do this by using the differential pressure sensor data 645 to determine air speed in an air distribution pipe. By looking at the sensor data 640, which may be temperature data, and the speed of the air in the air distribution pipe (derived from the differential sensor data 645), the controller can determine how much a damper in the air distribution pipe needs to move to supply the amount of air in the room to bring the air within the room to a defined space operating characteristic 130, which may be a desired temperature. The (first) controller 630 may then communicate that information back to the satellite controller 625, which may then communicate with the damper 615, telling it to move the determined amount. The (first) controller 630 may also use thermodynamic characteristics of the defined space 605, to more accurately determine how the space will be changing in the future, which would allow the controller to more accurately determine how the damper 615 should move; or when the HVAC equipment that heats or cools the air should turn on or off. This information may be used to lower energy costs, to lessen wear on equipment, to prevent fast cycling, to preferentially use certain equipment first, etc. The entire controller system (master controller, other controllers, etc.) may run a computer program, which may be distributed, to determine the thermodynamic characteristic of the defined space to determine more optimal damper (or other device) actions.

A full HVAC system can be thought of as one big state changer, that produces cold or hot air. That air should be distributed throughout a building. To control how much of that hot/cold air goes into each rooms, a damper can be inserted in-line with the air distribution pipes. The damper is a plate inside the pipe, that has a motor on the side to open and close it. With reference to the damper picture, a motor 710 actuates the plate inside. A controller, which may be a satellite controller, may have a differential pressure sensor that can measure pressure difference between two tubes. One tube will go to the left, the other to the right of that damper. Using the difference in pressure between the tubes, how much air flows through that specific piece of pipe can now be calculated. Using sensors inside the room, given other states, such as temperature/humidity, etc, the controller system can now employ an algorithm to determine how much air it needs to pump into the room to achieve the optimal temperature, for example. Controllers, including satellite controllers, can interface with a multitude of different sensor types. In some implementations, the controller uses a satellite to modify defined space state on the fly to achieve comfort goals.

III. Exemplary Methods to Manage Building Operating Behavior

Figure 9:
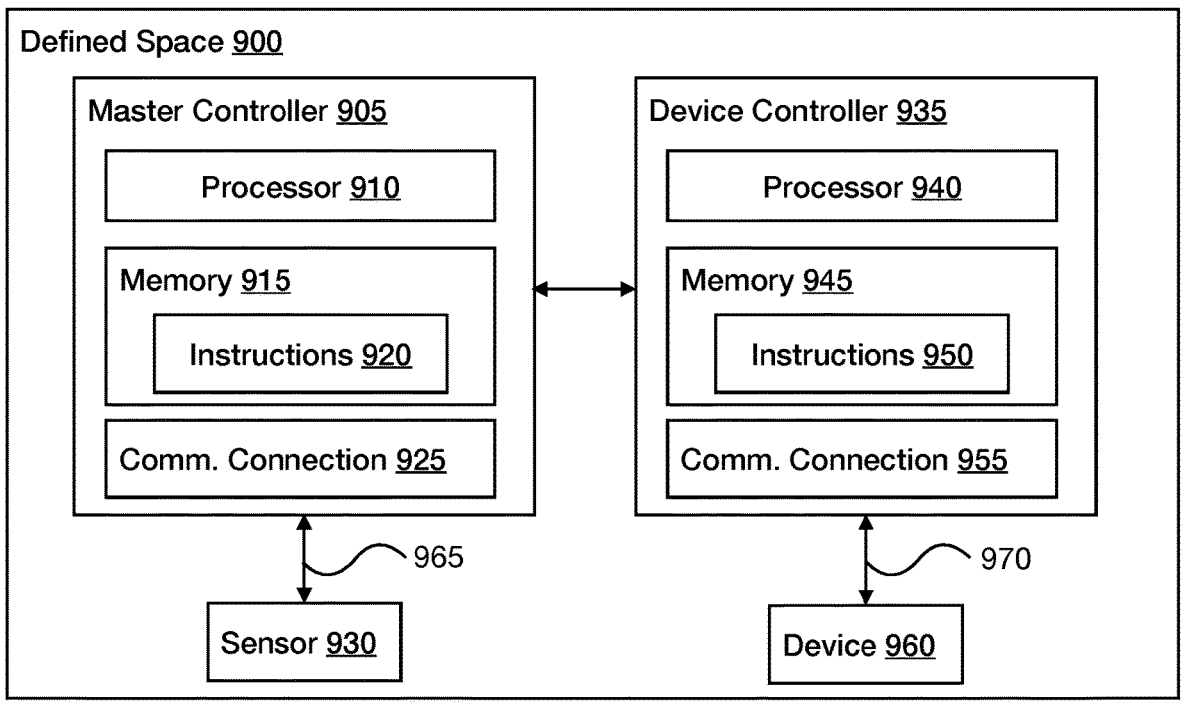
FIG. 9 is a block diagram illustrating an embodiment between a master controller and a device controller in conjunction with which described embodiments can be implemented.

FIG. 9 illustrates some systems embodied in a block diagram that may be used with any of the embodiments described herein. A defined space 900 is any space that can be defined. Examples include a building, a portion of a building such as a floor of a building, a zone within a building, a set of offices within a building, a room in a building, a building and related outbuildings, a field with irrigation equipment and other equipment that changes state in the space, such as heaters, etc. The defined space has a master controller 905 within it. More about master controllers can be learned with reference to FIGS. 2 and 3, and the associated text. The master controller 905 has a processor 910, memory 915, with instructions 920 within the memory.

The master controller also has a communication connection 925 it uses to pass information to and receive information from other controllers, devices and sensors. This connection may be wired, wireless, or a combination of the two. There are also one or more other device controllers, with processors 940, memory 945, instructions 950, and communication connections 955, which also may be wired, wireless, or a combination of the two. The controllers 905, 935 also have sensors 930 and devices 960 attached to them, through which attachments the controllers can send information 965, 970 to and from through their communication connections 925, 955. Devices 960 and sensors 930 may be directly wired to a controller 935, or may have a wireless connection. Some devices and sensors may have a combination of wired and wireless connections. Some device and sensors may have both a wired and a wireless connection.

Figure 10:
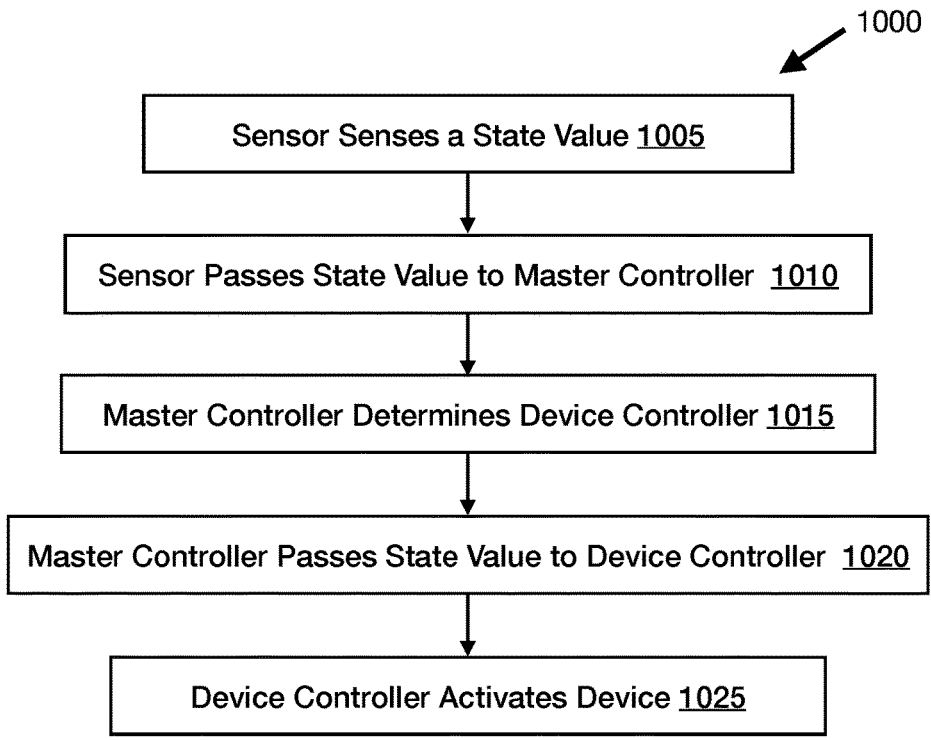
FIG. 10 is a flowchart illustrating an embodiment describing sensor-controller-device interaction with which described embodiments can be implemented.

FIG. 10 illustrates some method embodiments in a flowchart 1000. Technical processes shown in the figure or otherwise disclosed may be performed in some embodiments automatically, e.g., by a requiring little or no contemporaneous live user input. In a given embodiment zero or more illustrated steps of a method may be repeated, perhaps with different values, sensors, controllers, or devices to operate on. Steps in an embodiment may also be done in a different order than the top-to-bottom order that is laid out in FIG. 10. In a given embodiment zero or more illustrated steps of a method may be repeated, perhaps with different values, sensors, controllers, or devices to operate on. Steps may be performed in a partially overlapping manner, or fully in parallel, serially. The order in which flowchart 1000 is traversed to indicate the steps performed may vary from one performance of the method to another performance of the method. The flowchart traversal order may also vary from one method embodiment to method embodiment. Steps may also be omitted, combined, renamed, regrouped, or otherwise depart from the illustrated flows, provided that the method performed conforms to at least one claim.

Within a defined space, sensors sense state values 1005, e.g., temperature values, humidity values, atmospheric pressure values, sound pressure values, occupancy values, indoor air quality values, $CO_2$ concentration, light intensity, etc. These values are then sent, (e.g., at intervals, continually, etc.), to a controller. The controller the values are sent to may be a designated controller for a specific sensor. In some embodiments, sensors may send their values to a controller designated at the controller to receive their messages. If this controller is down, the sensors may send their messages to an alternate controller, and so on, until a controller is found that accepts their input. In some implementations, the sensor passes its state value to a master controller 1010. In some implementations, the sensor passes its value to a controller which then passes its value to a master controller. In some implementations, a sensor passes its value to its designated controller, and the controller does not pass the value to a master controller.

In some instances, the master controller determines that the state value indicates that an action needs to take place to ensure that the defined space stays within a set of defined operating characteristics. In such a case, the master controller may determine which device 1015 operating characteristics could be modified to have the defined space move back into the defined operating characteristics. This may require changing state of more than one device, or only changing state of a single device. The master controller may then pass the state value or a value that uses the state value to the controller 1020 to instruct it to activate the device 1025 (or devices) so it/they modifies the state of the defined space. In some embodiments, the master controller sends the device controller minimal information, with the device controller determining which device operating characteristics should be modified so the defined space state meets the defined operating characteristics.

In some embodiments, defined operating characteristics are a set of comfort goals that a space should reach within certain parameters. In the simplest form, comfort goals are state values, such as "the temperature should be between 70° and 72°. Occupancy comfort can be atomized to the comfort of specific humans. Parameters that can be determined on a person-specific level comprise: heat of person, convection, sweat, activity levels, metabolic rate, location, coo (the insulation value of the clothing a person is wearing), The comfort goal may be used to determine permissible comfort values. In some embodiments the comfort goal is expressed as a number value (such as a value between 0 and 3) that defines how close to absolute comfort we hope the model to get. The comfort goal, in some implementations, gives an allowable error range for the specific state values allowed; a low value may indicate that the comfort value must be closely matched, while a higher number may indicate that there is more leeway allowed. The values may be reversed, such that a low value indicates a higher tolerance for error, etc. Some collection of these features may be used to determine how a device or devices should be modified to reach a stated comfort goal. The comfort level may consider: 1) Building comfort, 2) occupancy comfort, and/or 3) specific time-based issues.

Building comfort: Theses are basic building states to ensure that the building zone state does not cause problems for the actual building zone structure. Examples of this are: keeping building zones warm enough to not freeze the pipes, keeping the humidity at a level to not cause mildew, or to keep musical instruments and furniture from suffering damage, or to keep steel from rusting.

Occupancy Comfort: In one embodiment, some portion of the building may have a file of person (height, weight). The building may also be able to monitor activity level by, for example accessing a wearable fitness device or a phone associated with someone in the building. Through this information automation processes in the the building may be able to infer metabolic rate. Using the metabolic rate the master controller 905, and/or the device controller 935 may be able to make a good guess as to what temperature (or other states) the person with the wearable fitness device would prefer. A person could also have temperature and other building state preferences on file that the automation system then attempts to meet (within the other competing needs within the building.)

Specific time-based issues. A defined space, such as a building, may have set times when certain states should be met. For example, the times a building zone is closed to humans, it can have a different comfort level than when people are in it. When an office is scheduled to be empty, it might be assigned a different comfort level than when it is full of workers. If an office has a meeting scheduled at 1:00 pm with 25 attendees, at 1:00 pm 100 watts of energy (approx.) for each person will be in that office and so the temperature schedule may account for this.

The controller (or controller then activates the device 1025 (or devices) necessary to reach the comfort value and/or the defined operating characteristic. Activating may comprise turning a device on, turning a device off, turning a device to an intermediate setting, etc.

Figure 11:
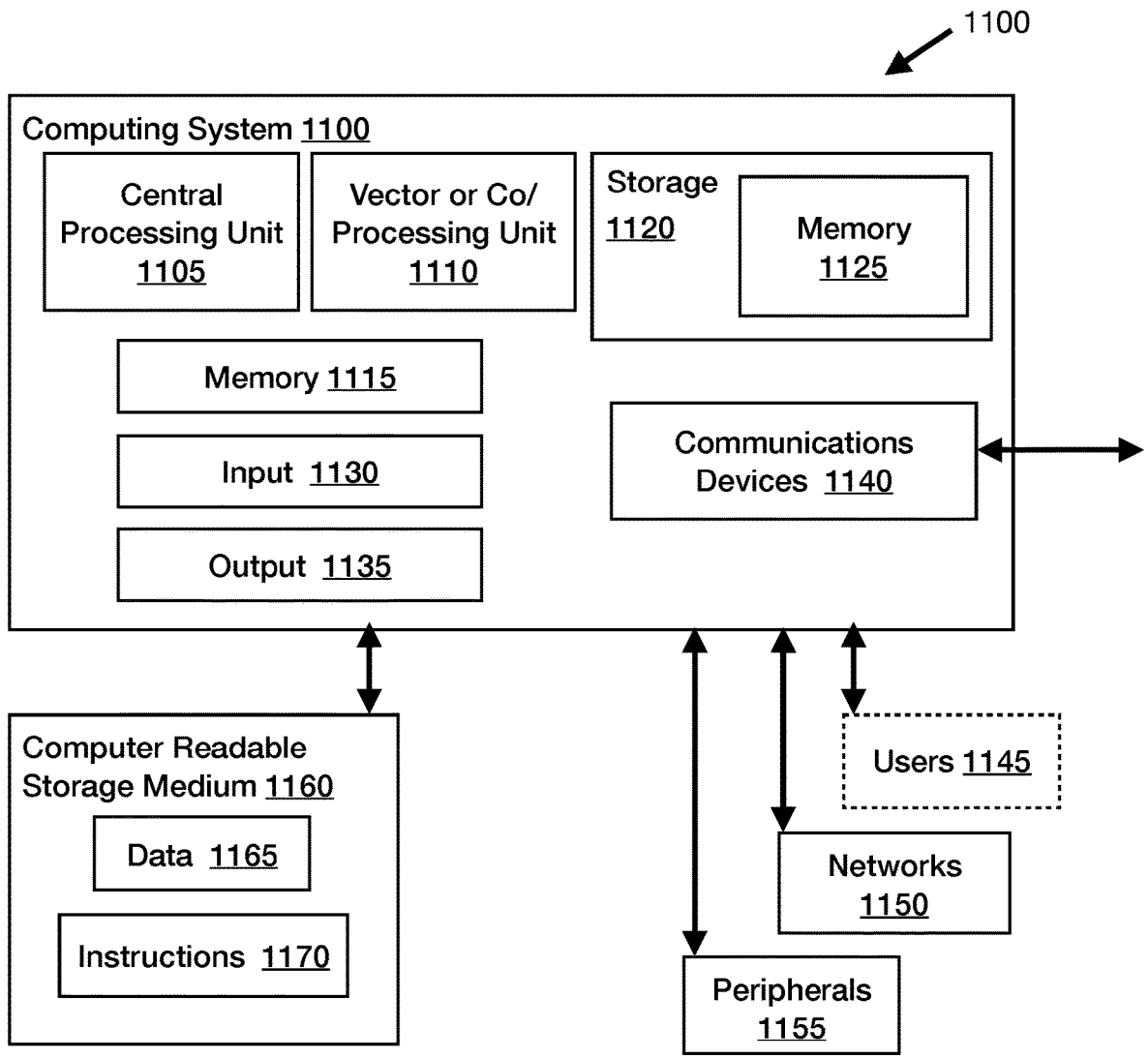
FIG. 11 is a functional block diagram showing an exemplary embodiment of a computing system in conjunction which described embodiments can be implemented.

FIG. 11 illustrates a generalized example of a suitable computing environment 1100 in which described embodiments may be implemented. The computing environment 11900 is not intended to suggest any limitation as to scope of use or functionality of the disclosure, as the present disclosure may be implemented in diverse general-purpose or special-purpose computing environments. This computing system may be implemented within a single controller or within a distributed controller system.

With reference to FIG. 11, the computing environment 1100 includes at least one central processing unit 1105 and memory 1115, 1120. The central processing unit 1105 executes computer-executable instructions and may be a real or a virtual processor. It may also comprise a vector processor, 1110 which allows same-length neuron strings to be processed rapidly. In a multi-processing system, multiple processing units execute computer-executable instructions to increase processing power and as such the vector processor 1110, GPU and CPU 1105 can be running simultaneously. The memory 1115, 1125 may be volatile memory (e.g., registers, cache, RAM), non-volatile memory (e.g., ROM, EEPROM, flash memory, etc.), or some combination of the two.

A computing environment may have additional features. For example, the computing environment 1100 includes storage 1140, one or more input devices 1150, one or more output devices 1160, and one or more communication connections 1170. An interconnection mechanism (not shown) such as a bus, controller, or network interconnects the components of the computing environment 1100. Typically, operating system software (not shown) provides an operating environment for other software executing in the computing environment 1100, and coordinates activities of the components of the computing environment 1100. The computing system may also be distributed; running portions of the software 1185 on different CPUs.

The storage 1140 may be removable or non-removable, and includes magnetic disks, magnetic tapes or cassettes, CD-ROMs, CD-RWs, DVDs, flash drives, or any other medium which can be used to store information and which can be accessed within the computing environment 1100. The storage 1140 stores instructions for the software to implement methods of neuron discretization and creation.

The input device(s) 1150 may be a touch input device such as a keyboard, mouse, pen, or trackball, a voice input device, a scanning device, touchscreen, or another device that provides input to the computing environment 1100. For audio, the input device(s) 1130 may be a sound card or similar device that accepts audio input in analog or digital form, or a CD-ROM reader that provides audio samples to the computing environment. The output device(s) 1135 may be a display, printer, speaker, CD-writer, or another device that provides output from the computing environment 1100.

The communication connection(s) 1140 enable communication over a communication medium to another computing entity. The communication medium conveys information such as computer-executable instructions, compressed graphics information, or other data in a modulated data signal. These connections may include network connections 1150, which may be wireless connections, may include dial-up connections, and so on. The other computing entity may be a portable communications device such as a wireless handheld device, a cell phone device, and so on. Users 1145 may interact with the communications devices 1140, the peripherals 1155, etc.

Computer-readable media are any available non-transient tangible media that can be accessed within a computing environment. By way of example, and not limitation, with the computing environment 1100, computer-readable storage media 1160 may include memory 1115, 1125, communication media, and combinations of any of the above. Configurable media 1160 which may be used to store computer readable media comprises instructions 1170 and data 1165.

Moreover, any of the methods, apparatus, and systems described herein can be used in conjunction with combining abstract interpreters in a wide variety of contexts.

Although the operations of some of the disclosed methods are described in a particular, sequential order for convenient presentation, it should be understood that this manner of description encompasses rearrangement, unless a particular ordering is required by specific language set forth below. For example, operations described sequentially can be rearranged or performed concurrently. Moreover, for the sake of simplicity, the attached figures may not show the various ways in which the disclosed methods, apparatus, and systems can be used in conjunction with other methods, apparatus, and systems. Additionally, the description sometimes uses terms like "determine," "build," "optimize," and "identify" to describe the disclosed technology. These terms are high-level abstractions of the actual operations that are performed. The actual operations that correspond to these terms will vary depending on the particular implementation and are readily discernible by one of ordinary skill in the art.

Further, data produced from any of the disclosed methods can be created, updated, or stored on tangible computer-readable media (e.g., tangible computer-readable media, such as one or more CDs, volatile memory components (such as DRAM or SRAM), or nonvolatile memory components (such as hard drives) using a variety of different data structures or formats. Such data can be created or updated at a local computer or over a network (e.g., by a server computer), or stored and accessed in a cloud computing environment.

In view of the many possible embodiments to which the principles of the disclosed invention may be applied, it should be recognized that the illustrated embodiments are only examples of the invention and should not be taken as limiting the scope of the invention. Rather, the scope of the invention is defined by the following claims. We therefore claim as our invention all that comes within the scope and spirit of these claims.

We claim:

1. A system for using distributed building automation controllers to compute building operating behavior within a defined space comprising:
   a device with a device characteristic;
   a sensor with sensor data;
   a first controller with computing hardware and programmable memory that controls at least a portion of the device and accepts data from the sensor;
   a desired defined space operating characteristic;
   a second controller with computing hardware and programmable memory;
   a satellite controller; and
   a computer program at least partially stored within programmable memory in the first controller or the second controller, wherein the first controller and the second controller are operationally able to run the computer program, comprising the computer program operationally able to determine desired device behavior based on the desired defined space operating characteristic, the sensor data, and the device characteristic, wherein first controller and the second controller operationally able to run the computer program comprises the first controller and the second controller operationally able to choose the first controller or the second controller to be a master controller, and wherein the master controller comprises the first controller or the second controller, wherein running the computer program further comprises the master controller dividing the computer program into at least a first chunk and a second chunk, and determining to run a first chunk on the first controller and a second chunk on the second controller.

2. The system of claim 1, wherein running the computer program further comprises the master controller is operationally able to divide the computer program into at least a first chunk, and a second chunk, and operationally able to determine to run the first chunk on the first controller, and the second chunk on the satellite controller.

3. The system of claim 1, wherein each controller has an error state, wherein the master controller error state is "on" and wherein the controllers whose error functions are not on and which are not satellite controllers, are operationally able to choose a new master controller.

4. The system of claim 1, further comprising the first controller, and the satellite controller operationally able to assemble into a network using a wireless or a wired method of communication.

5. The system of claim 1, wherein the desired defined space operating characteristic comprises at least one of temperature characteristic, humidity characteristic, radiant heat characteristic, desired entertainment, sound characteristic, grounds feature characteristic, or security characteristic.

6. The system of claim 1, wherein the defined space further comprises an air velocity sensor attached to a first device in the defined space, and wherein the first controller is operationally able to use the data associated with the air velocity sensor and the sensor data to modify behavior of the first device based on the desired defined space operating characteristic.

7. The system of claim 1, wherein the defined space further comprises a differential pressure sensor attached to a first device in the defined space, wherein the satellite controller is operationally able to send data associated with the differential pressure sensor and the sensor data to the first controller, and wherein the first controller is operationally able to use data from the differential pressure sensor and data from the sensor to determine behavior of the first device necessary to conform to the desired defined space operating characteristic.

8. The system of claim 7, wherein the first controller is operationally able to send information to the satellite controller which is operationally able to modify the behavior of the first device to conform to the desired defined space operating characteristic.

9. The system of claim 1, wherein the first controller is operationally able to control the device to match the desired device behavior.

10. A method for using distributed defined space controllers to compute defined space operating behavior, the distributed defined space controllers each having at least one processor coupled with memory-stored instructions, one of the distributed defined space controllers designated as a first controller, one other of the distributed defined space controllers defined as a second controller, a sensor, a satellite controller, and a device operationally coupled to one of the distributed defined space controllers, the method comprising:

the sensor sensing a sensor state value;
the sensor passing the sensor state value to a computer program;
the computer program determining a device to modify based on the sensor state value,
the computer program determining a device controller that controls the device;
the computer program passing a value dependent on the sensor state value, desired defined space operating characteristic, and a characteristic of the device to the device controller;
the first controller and the second controller operationally able to choose the first controller or the second controller to be a master controller;
the master controller dividing the computer program into at least a first chunk and a second chunk, and the master controller determining to run a first chunk on the first controller;
the master controller passing a value dependent on the sensor state value, desired defined space operating characteristic, and a characteristic of the device to the device controller; and
the device controller using the value dependent on the sensor state value to control the device.

11. The method of claim 10, further comprising the value dependent on the sensor state value being a comfort value.

12. The method of claim 11, further comprising the comfort value being dependent on at least one of: building comfort, occupancy comfort, or time-based issues.

13. The method of claim 12, further comprising the distributed defined space controllers being in a defined space.

14. The method of claim 10, further comprising calculating the value dependent on the sensor state value comprising calculating a comfort value.

15. The method of claim 14, wherein the comfort value comprises building comfort, occupancy comfort, or time-based issues.

16. The method of claim 10, wherein each controller has an error state, wherein a master controller error state is "on" and wherein the distributed defined space controllers whose error functions are not on and which are not satellite controllers, are operationally able to choose a new master controller.

17. A computer-readable storage medium configured with executable instructions to perform a method for using distributed defined space automation controllers to compute building operating behavior, the distributed defined space automation controllers having at least one processor coupled with memory-stored instructions, the method comprising:

determining, by a distributed defined space automation controller, a device characteristic of a device within a defined space, the device controllable by the distributed defined space automation controller; one of the distributed defined space automation controllers designated as a first controller, one other of the distributed defined space automation controllers defined as a second controller, a sensor, a satellite controller, and a device operationally coupled to one of the distributed defined space automation controllers;
determining, by the distributed defined space automation controller, sensor data from a sensor within the defined space;
determining a desired defined space operating characteristic;
running a program, using the distributed defined space automation controller, the program determining desired device behavior based on the desired defined space operating characteristic, thermodynamic characteristics of the defined space, the sensor data, and the device characteristic;

the distributed defined space automation controller controlling the device to match the desired device behavior;
a computer program operationally able to determine desired device behavior based on the desired defined space operating characteristic, the sensor data, and the device characteristic;
the first controller and the second controller operationally able to choose the first controller or the second controller to be a master controller;
the master controller dividing the computer program into at least a first chunk and a second chunk; and
determining to run a first chunk on the first controller and a second chunk on the second controller.

18. The computer-readable storage medium of claim 17, wherein running a program comprises running a machine learning program that computes a cost function based on the desired defined space operating characteristic.

19. The computer-readable storage medium of claim 18, wherein the master controller divides the computer program into the first chunk, the second chunk, and a third chunk and determines to run the first chunk on the first controller, the second chunk on the second controller, and the third chunk on the satellite controller.

20. The computer-readable storage medium of claim 19, wherein one of the distributed defined space automation controllers is designated as a third controller, the first controller is the master controller, the master controller has an error state, and wherein the second controller and the third controller are operationally able to choose the second controller or the third controller to be a master controller.

* * * * *